US012617159B2

(12) United States Patent
Borish et al.

(10) Patent No.: US 12,617,159 B2
(45) Date of Patent: May 5, 2026

(54) WIRE ANCHORING FOR CO-EXTRUDED PRINTING

(71) Applicant: UT Battelle, LLC, Oak Ridge, TN (US)

(72) Inventors: Michael C. Borish, Knoxville, TN (US); Alex C. Roschli, Knoxville, TN (US); Jesse Heineman, Knoxville, TN (US); Ahmed A. Hassen, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 44 days.

(21) Appl. No.: 18/761,872

(22) Filed: Jul. 2, 2024

(65) Prior Publication Data

US 2025/0010553 A1     Jan. 9, 2025

Related U.S. Application Data

(60) Provisional application No. 63/525,557, filed on Jul. 7, 2023.

(51) Int. Cl.
| | |
|---|---|
| *B29C 64/393* | (2017.01) |
| *B29C 64/118* | (2017.01) |
| *B33Y 10/00* | (2015.01) |
| *B33Y 40/20* | (2020.01) |
| *B33Y 50/02* | (2015.01) |

(Continued)

(52) U.S. Cl.
CPC .......... *B29C 64/393* (2017.08); *B29C 64/118* (2017.08); *B33Y 10/00* (2014.12); *B33Y 40/20* (2020.01); *B33Y 50/02* (2014.12); *B33Y 70/10*

(2020.01); *B33Y 80/00* (2014.12); *B29K 2069/00* (2013.01); *B29K 2105/08* (2013.01); *B29K 2105/20* (2013.01); *B29K 2307/04* (2013.01); *B29K 2309/08* (2013.01); *B29K 2705/08* (2013.01); *B29L 2031/757* (2013.01)

(58) Field of Classification Search
CPC ..... B29C 64/118; B29C 64/393; B33Y 10/00; B33Y 30/00; B33Y 50/02
See application file for complete search history.

(56) References Cited

PUBLICATIONS

Borish ("Automated Path Planning for Wire Feeding in Large Format Polymer Additive Manufacturing" Solid Freeform Fabrication 2022: Proceedings of the 33rd Annual International Solid Freeform Fabrication Symposium, pp. 739-748). (Year: 2022).*

(Continued)

*Primary Examiner* — Larry W Thrower
(74) *Attorney, Agent, or Firm* — Warner Norcross + Judd LLP

(57) ABSTRACT

Methods and apparatus for embedding metallic wires within polymer structures through co-extrusion printing in large-format polymer additive manufacturing (LFPAM). The method includes receiving user input for object and wire regions, performing Boolean operations on the meshes, generating printing paths, and determining an optimized order for printing. The LFPAM tool, configured with a data processing apparatus, prints the object with embedded wire and anchors supporting the wire ends. The system may include the use of a cutting tool to separate the anchors from the printed object. This disclosure improves wire alignment, support, and printing performance, enhancing the properties of wire-embedded printed structures.

11 Claims, 10 Drawing Sheets

(51) Int. Cl.

| | |
|---|---|
| *B33Y 70/10* | (2020.01) |
| *B33Y 80/00* | (2015.01) |
| *B29K 69/00* | (2006.01) |
| *B29K 105/08* | (2006.01) |
| *B29K 105/20* | (2006.01) |
| *B29K 307/04* | (2006.01) |
| *B29K 309/08* | (2006.01) |
| *B29K 705/08* | (2006.01) |
| *B29L 31/00* | (2006.01) |

(56) References Cited

PUBLICATIONS

Hassen, A. et al., "The Durability of Large-Scale Additive Manufacturing Composite Molds," CAMX Conference Proceedings., Sep. 2016, pp. 1-11.

Khondoker, M. A. et al., "Direct 3D Printing of Stretchable Circuits via Liquid Metal Co-Extrusion Within Thermoplastic Filaments", Advanced Engineering Materials, Apr. 10, 2019, pp. 1-8.

Thakur, A. et al., "Printing with 3D Continuous Carbon Fiber Multifunctional Composites via UV-assisted Coextrusion Deposition", Manufacturing Letters, Feb. 19, 2020, pp. 1-5.

Jo, I. et al., "Coextrusion-Based 3D Plotting of Ceramic Pastes for Porous Calcium Phosphate Scaffolds Comprised of Hollow Filaments", Materials, May 29, 2018, pp. 1-16.

Atkins, C. et al., "Wire Co-Extrusion With Big Area Additive Manufacturing", Solid Freeform Fabrication Symposium, Dec. 1, 2019, pp. 1549-1557.

Roschli, A. et al., "Designing for Big Area Additive Manufacturing", Additive Manufacturing, 2019, vol. 25, pp. 1-45.

Billah, K. et al., "Large-Scale Additive Manufacturing of Self-Heating Molds", Additive Manufacturing, 2021, vol. 47, pp. 1-31.

Billah, K. et al., "Thermal Analysis of Large Area Additive Manufacturing Resistance Heating Composites for Out of Oven/Autoclave Applications", ASME International Mechanical Engineering Congress and Exposition, Nov. 11, 2020, pp. 1-6.

Bentley, J. et al., "Algorithms for Reporting and Counting Geometric Intersections", IEEE Transaction on Computers, Sep. 1979, vol. c-28, pp. 643-647.

* cited by examiner

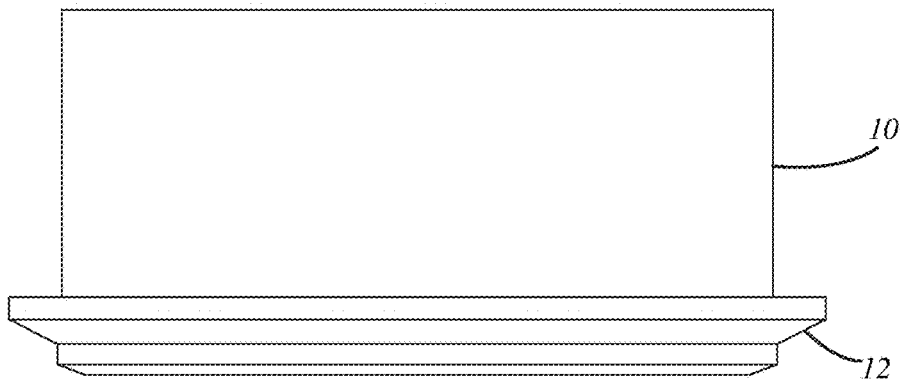
*Fig. 1A*
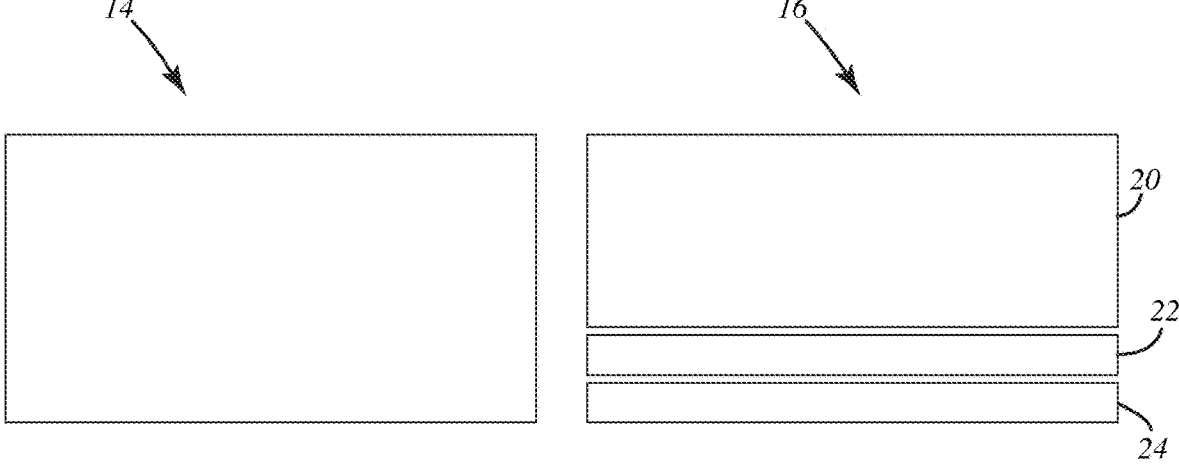
*Fig. 1B*                    *Fig. 1C*

900

902

904

WIRE ANCHORING FOR CO-EXTRUDED PRINTING

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

This disclosure relates to large-format polymer additive manufacturing (LFPAM) and more particularly to methods and apparatus for embedding metallic wires within polymer structures through co-extrusion printing processes to facilitate mold or die heating without the need for a large thermal oven.

An autoclave is a high-pressure, high-temperature vessel used in various industries for the manufacturing of high-performance composite parts. These parts are generally known for their strength, lightweight properties, and durability. The autoclave process ensures high quality and performance of composite parts but involves significant investment both in terms of equipment and labor. In contrast, Out-of-Autoclave (OOA) processes provide an alternative to traditional autoclave manufacturing. OOA processes generally reduce the need for expensive autoclave equipment. Instead of an autoclave, a thermal oven (e.g., as shown in FIG. 3) is often used, which reduces the equipment and operational costs while providing a controlled environment for composite part manufacturing. While both of these technologies can facilitate manufacture of high-performance composite parts, they both face significant challenges at scale. It is generally difficult and cost prohibitive to heat large-scale molds and dies using an autoclave or via an OOA process using a thermal oven.

Self-heated molds where co-extruded wire is embedded into the mold or die during construction offers a potential advantage over Autoclave and OOA processes. However, manufacturing large self-heated molds or dies includes a number of manual steps, which can make the process inefficient. Further, complex geometries can exacerbate these inefficiencies.

Additive manufacturing, also known as 3D printing, encompasses a variety of techniques for creating three-dimensional objects layer by layer. LFPAM, sometimes referred to as Big Area Additive Manufacturing (BAAM), has gained significant traction in various industries due to its ability to produce large-scale structures efficiently and cost-effectively. A prominent application of LFPAM is the production of tooling (e.g., molds and dies), which can be manufactured faster and at lower costs compared to conventional manufacturing methods. While these polymer-based large-format additive manufacturing technologies have proven attractive due to the large scale and speed with which objects can be constructed, ultimately producing a mold or die via additive manufacture still meant that the mold or die had to be used in conjunction with a large thermal oven in an OOA process, which can be cost prohibitive.

To address this, for many tooling applications, a self-heating tool is desired, i.e., a tool that includes embedded wires for heating the mold or die so that it does not need to be put in an Autoclave or a thermal oven in conjunction with an OOA process. The embedded wire can be connected to a power supply to heat the mold or die internally. The industry has started to develop coextrusion systems for extruding wire to construct these self-heated molds using large-scale additive manufacturing. While this coextrusion process has been somewhat successful, it relies on a manually modified toolpath process to accommodate the coextrusion of the wire. That is, pathing modifications necessary to correctly place the co-extruded wire are developed by hand on a tool-by-tool basis, and this pathing is generally only viable for relatively simple geometries. This manual process is time consuming and not practical for most large-scale self-heating molds and dies, especially those with complicated geometries.

An example of a known large format polymer system 400 that includes a pellet feeder system 402 and a wire co-extrusion system 404 is shown in FIG. 4. The pellet feeder system 402 includes a motor 414 that turns a screw 412. Polymer pellets can be fed into a pellet hopper 416, which are mixed by the screw 412 turning while simultaneously being heated and melted by the heaters 418. The melted polymer can be deposited via the dual port coextrusion nozzle onto the print bed 406 in the form of a polymer bead 408. The wire co-extrusion system 404 includes a feeding motor 420 that controls the release of wire 424 from a wire spool 420 through the coextrusion nozzle 410. A tamper 426 can assist in providing consistent material feed and proper placement. The wire can be cut using an air-based wire-cutting system.

An exemplary user interface of slicing software used in the additive manufacturing process is shown in FIG. 5. This interface generally illustrates the process of preparing a 3D model, such as a tool or mold, for printing. The slicing software is used to generate instructions for control of material deposition and the integration of different materials, such as wire.

Despite its advantages, the implementation of coextrusion in additive manufacturing presents challenges, particularly in the precise control of material deposition and the integration of different materials. The development of sophisticated slicing software and advanced printing techniques continues to evolve, aiming to improve the accuracy and efficiency of coextrusion processes. For example, each 3D printed tool design has unique geometries and different tooling zones or surfaces that may require embedded wire. This necessitates precise control over wire placement. Additionally, the wires must be left protruding from the tool on the ends so that they can be properly anchored to prevent tangling. The process of anchoring the wires such that they are constrained during printing but can be freed after the print process currently involves handwriting code specific to the precise geometry of the tool being printed. This is somewhat feasible for simple and small shapes but introduces significant tedium each time a slight modification or new geometry is desired. Improved and automated wire pathing solutions are needed.

SUMMARY OF THE INVENTION

The present disclosure relates to methods, systems, and memory encoding instructions for automating the placement and embedding of wires within polymer structures during additive manufacturing processes. Certain aspects of the disclosure facilitate the automatic embedding of wires through co-extrusion printing using large-format polymer additive manufacturing (LFPAM) systems, which is particularly useful for creating composite molds or dies with embedded heating elements.

The system can include memory encoding instructions, which when executed by a data processing apparatus, cause the apparatus to perform several operations. These include receiving user inputs to define a building mesh indicative of an object to be printed and a settings mesh indicative of the wire region. The user or the algorithm can define an anchor mesh to support the ends of the metallic wire. The process involves performing Boolean intersection and Boolean join operations on the meshes to create distinct regions for the surface, wire, and base areas of the object. Corresponding pathing algorithms are then generated for each region. The paths are ordered to ensure that the wire embedding paths are traversed last for the relevant layers, ensuring proper alignment and tensioning of the wire during manufacture. The LFPAM system can be instructed to print the object according to these instructions to generate a mold or die with embedded wire and anchors.

The disclosure also includes a method for additively manufacturing a mold with embedded wire. This method involves receiving user input to define the building and settings meshes, automatically performing Boolean operations to generate a representation of a mold with embedded wire, and automatically generating toolpaths for different layers of the mold. The method further includes automatically determining the traversal order of these toolpaths to ensure efficient co-extrusion, embedding, and tensioning of the wire during the printing process. The LFPAM system used in this method is capable of automatically printing the mold layer-by-layer, embedding the wires and tensioning the wires using anchors.

Additionally, the disclosure encompasses a system for co-extrusion printing with embedded wire, comprising a data processing apparatus and an LFPAM tool. The data processing apparatus executes the memory encoding instructions to automatically manage the manipulation of the mesh volumes to perform the Boolean operations, creation of mesh sub-regions for printing and wire co-extrusion, generate pathing solutions, and determine the optimal order for traversing the printing paths. The LFPAM tool then prints the object based on these instructions, embedding the wire and supporting the wire ends with anchors.

The memory encoding instructions further support the generation of a three-dimensional user interface for defining the meshes, integration with a slicing algorithm within a slicer software package, and optimization of the pathing algorithms. The instructions also ensure that the anchors maintain tension on the wire during the printing process.

The innovations described herein address significant challenges in the additive manufacturing of large-scale composite molds and dies with embedded wire. For example, the use of embedded heating elements in molds and dies alleviates the high costs associated with large thermal ovens used in Out-of-Autoclave (OOA) processes that would otherwise be needed to heat these molds and dies. An improved slicing algorithm that enables automated generation of pathing for constructing molds with embedded heating elements addresses many of these challenges. This automated approach contrasts with the previously manual and time-consuming processes and is particularly beneficial for more complex geometries. The algorithm allows the creation of sacrificial anchors to maintain wire tension during the printing process, a factor for ensuring proper wire embedding and functionality of the final product. These innovations provide a minimal increase in computation compared to typical slicing processes, thus maintaining efficiency while adding significant value.

This disclosure significantly advances the capabilities of co-extrusion in large-scale additive manufacturing, providing automated, precise, and efficient embedding of metallic wires within printed polymer structures.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 1A illustrates an exemplary representative three-dimensional user interface for defining build and wire feed areas of an object to be additively manufactured.

FIG. 1B illustrates an exemplary representative top-down cross-section plan view of an unmodified cross-section of the object to be printed.

FIG. 1C illustrates an exemplary representative top-down cross-section plan view of the object after modification, showing base, wire feed, and surface regions.

DESCRIPTION OF THE CURRENT EMBODIMENTS

This disclosure describes technologies for automating the placement and tooling for wire co-extrusion with anchoring. The disclosure describes systems and methods related to automating placement and tooling for wire co-extrusion with anchoring in large-format polymer additive manufacturing (LFPAM). The disclosed systems and methods automate the anchoring of wires during the printing process by encapsulating the wire within anchor beads placed on each end of the mold surface. This automation can be implemented during the slicing and tool-pathing steps of a 3D print setup process, allowing users to define the areas to be heated with wires while the software handles the toolpath and anchor generation automatically to provide this functionality.

Figure 7:
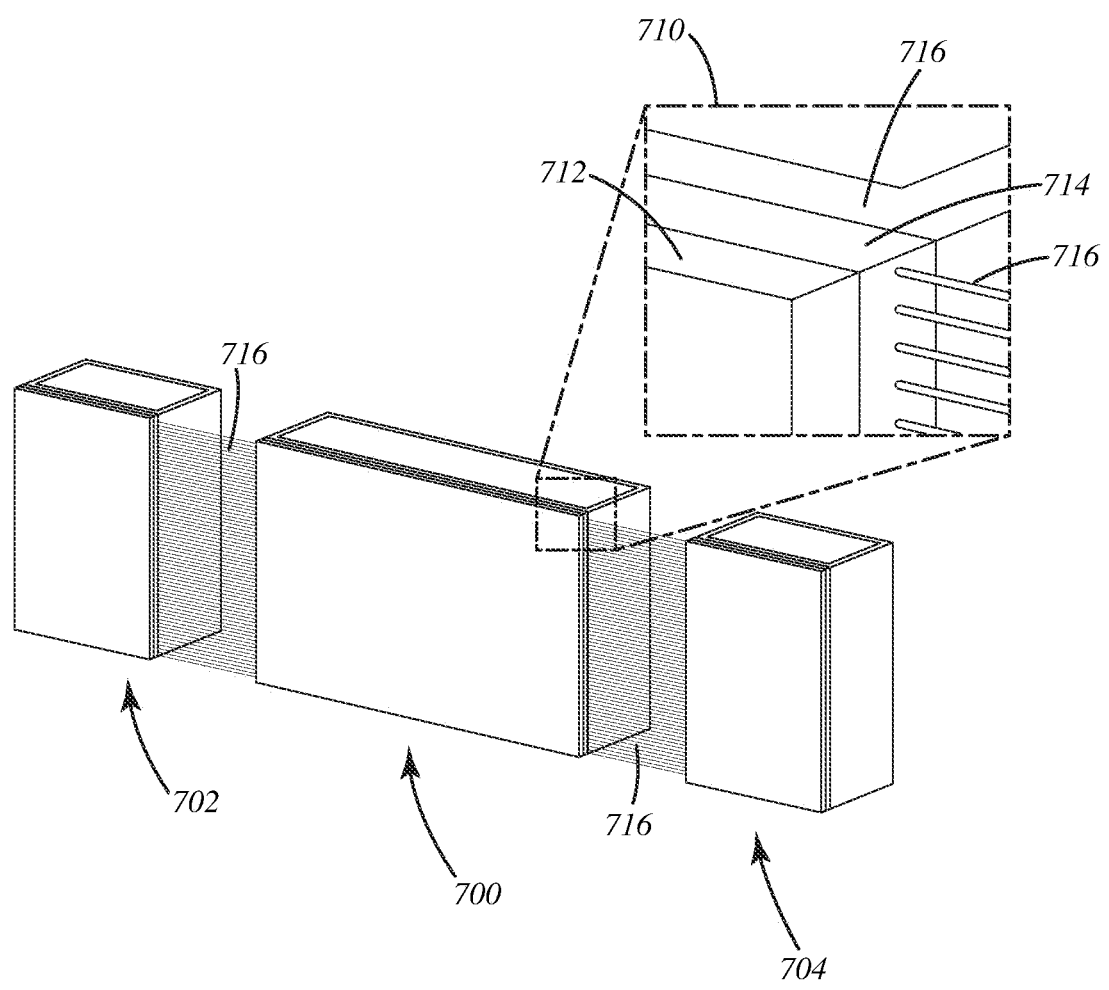
FIG. 7 illustrates an exemplary rendering of an additively manufactured mold having an embedded heating element that is tensioned by anchors during the manufacturing process.

The development of the systems and methods of the present disclosure show significant improvement over prior manual pathing solutions, where pathing modifications necessary to correctly place and retain co-extruded wire were developed by hand. This manual process is time consuming and is not practical for complex geometries. The present disclosure provides an automated process that leverages settings meshes for defining regions of interest and Boolean operations for mesh manipulation. This enables automated generation of pathing for wire co-extrusion. Perhaps as best shown in FIG. 7, a representative rendering of an exemplary mold with embedded wire helps to visualize the end goal of the disclosed algorithm. That is, the mold with embedded wire is three beads in thickness, with the wire embedding bead 714 sitting between the remaining geometry provided by the surface bead 712 and the edge of the base region bead 716. For ease of discussion, the outer bead, wire embedded bead, and remaining geometry can also be referred to as the surface region 712, wire region 714, and base region 716. Because the wire region 714 extends across the entire surface of the mold, pathing for the base region is automatically modified to accommodate. Additionally, to ensure that the wire is taut during construction, sacrificial anchors are constructed on either or both sides of the object. The purpose of the anchors is to provide a surface upon which the wire region can adhere as layer-wise construction continues. The wire region extends across the front of the mold to the outer boundary of each anchor. This configuration ensures proper adhesion and tensioning of the wire. The sacrificial anchors 702, 704 maintain wire tension during construction.

The settings meshes for path modification, Boolean operations for mesh manipulation, and anchor generation for wire tensioning all facilitate automated slicing and pathing, reducing the need for manual intervention and enabling the production of complex geometries with embedded heating elements that were previously unavailable.

Wire can be encapsulated within printed anchors that both leave the wire exposed for electrical connection and ensure it remains secure during the print. One embodiment includes steps in a software slicing process to define the wire placement area and section the part so that suitable pathing can be created for the 3D printing material to both encapsulate the wire and for anchor generation, e.g., on one or both sides of the part.

Figure 6A:
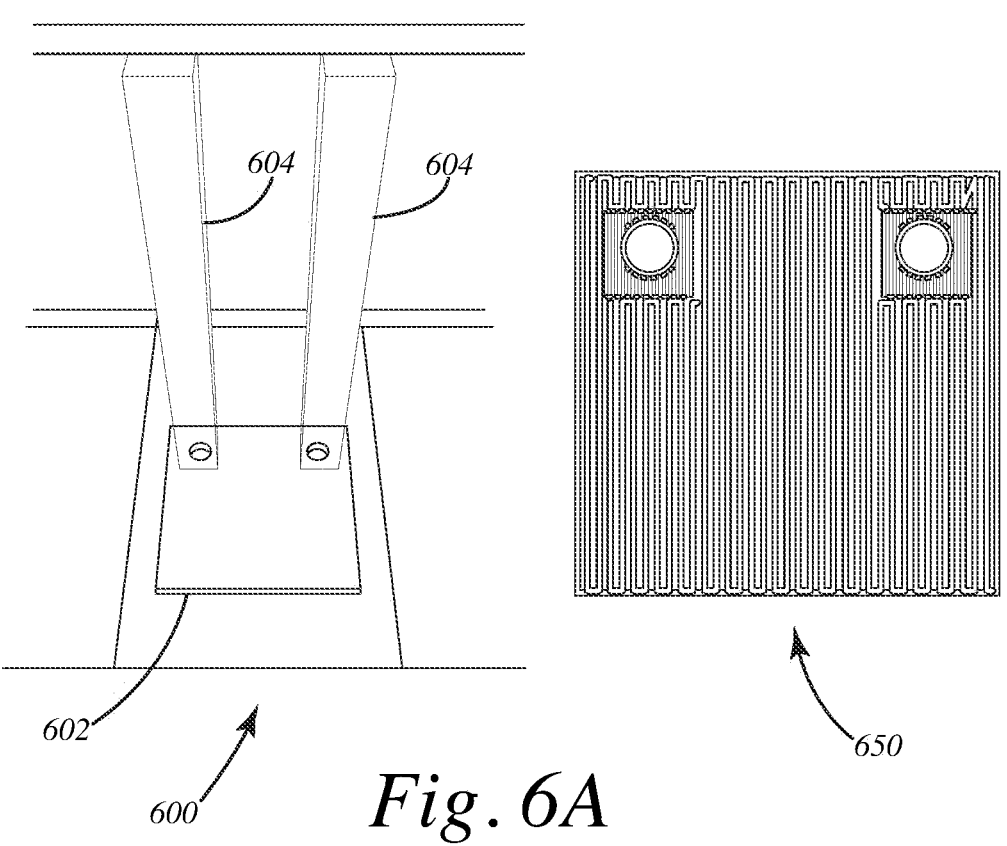
FIG. 6A illustrates perspective and top-down schematic views of a build and settings meshes.

To facilitate automatic path generation, several components in the slicing software can be utilized. These include settings mesh Boolean operations, anchor generation, unique base region pathing solution, and a restriction on post-processing travel optimization. The slicing software in accordance with the present disclosure allows a user to import multiple types of meshes. The build mesh represents the typical object in most slicers, e.g., the mold or die being constructed. The slicing software can cross-section this object and produce all pathing based on user settings. The settings mesh allows a user to modify existing pathing within a build mesh. An example of this is shown in FIG. 6A. In this example, two setting meshes 604 were loaded on top of the square build mesh 602. In each of the settings meshes, the infill density is changed. As a result, the area around the holes is densified to provide additional stock should the holes be bored. The settings meshes as shown in FIG. 6 are limited to modifying pathing in the specific specified regions. In this case, infill and its relative density. Settings meshes are extended to provide Boolean mesh operations such as union and intersection of 3D bodies.

The slicing software and associated algorithms can be implemented as an automated process for emplacing wires. For example, it can be integrated as a plugin module for a conventional slicer software package used for slicing and toolpath generation in additive manufacturing. The plugin module can be based on a wire feeding algorithm that can supplement or replace a wire feeding algorithm in the main slicer software package. That is, the plugin can essentially provide a wire feeding algorithm that can be integrated into the main slicer software package or that can be executed separate from the main slicing software package.

Perhaps as best shown in FIG. 1A, an exemplary three-dimensional user interface for defining areas for use by a wire feeding algorithm in accordance with the present disclosure is illustrated. The user interface responds to user input to define an exemplary mold area 10 and an exemplary wire feed area 12. The mold area 10 represents the object or tool being 3D printed, while the wire feed area 12 represents where the embedded wire is to be placed.

A three-dimensional representation of the tool or primary object can be created using the user interface or loaded into 3D printing software using a pre-defined model, which the user desires to have wire embedded. This new representation that accounts for the wire feed area can be referred to as wire feed modified tool geometry or simply modified geometry. The user can select, insert, or create a three-dimensional object that represents an area to contain wire. This representation can be manipulated in the user interface to intersect the tool, which can also be referred to as the primary object, and generate a combinational representation of the tool with the area of the tool where the wire is to be embedded. Once the wire intersection region is defined in the tool, a wire embedding slicing algorithm can create a representation with distinct regions so that unique pathing can be generated for each region. In some embodiments, an unmodified cross-section of the tool or object 14 can be generated as an intermediary step, such as depicted in the top-down plan view of FIG. 1B. As shown in FIG. 1C, a top-down cross-section plan view representation of the object or tool 16 can be generated based on the mold area 10, the wire feed area 12, the three-dimensional object representing the intersection of the mold area 10 and the wire feed area 12, or any combination thereof. For the avoidance of doubt, in some embodiments, the slicing software may not be configured to generate any intermediate models that are available or visible to the user, such as an unmodified cross-section 14. In some embodiments, the slicing software may be configured to generate different or multiple intermediate models other than the unmodified tool cross-section representation 14. As discussed in more detail below, a fourth, anchor region, can be generated based upon user settings that defines the location and shape of wire anchoring parts.

In the depicted embodiment there are three resultant regions in the modified cross-section or geometry: (i) the base region 20, e.g., the supporting structure of the tool, (ii) the wire region 22, e.g., the beads containing a co-extruded wire, and (iii) the surface region 24, e.g., the bead on the outermost surface of the tool. The sliced wire embedded tool model 16 depicted in FIG. 1C shows the three regions (base region 20, wire region 22, and surface region 24) split apart to emphasize they are separate regions that can be printed according to different 3D printing rules and parameters. This separation may be exaggerated in FIG. 1C to aid with explanation, in other embodiments, the generated slicing may be represented in a different fashion, e.g., according to a suitable 3D printing software slicing convention.

Toolpaths can be generated based on the newly modified geometry, the original unedited geometry, or a combination thereof. The modified geometry can be used for creating the precise pathing instructions for an additive manufacturing machine to additively manufacture a tool with the wire region, surface region, and anchor region. The original geometry or the modified geometry can be used for creating toolpaths for the base region. The base region toolpathing can be intersected with the wire and surface region pathing to remove any overlapping pathing, e.g., from the base region pathing.

Figure 2:
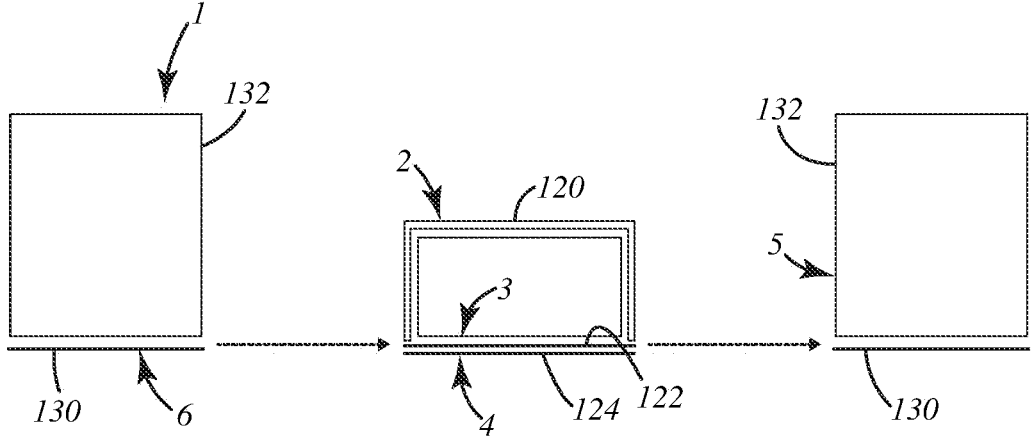
FIG. 2 illustrates a representative schematic diagram showing exemplary toolpaths combined with travel segments and suitable ordering to facilitate the wire feed area bead printing and the wire extrusion being conducted in a single pass for a given layer.
Figure 3:
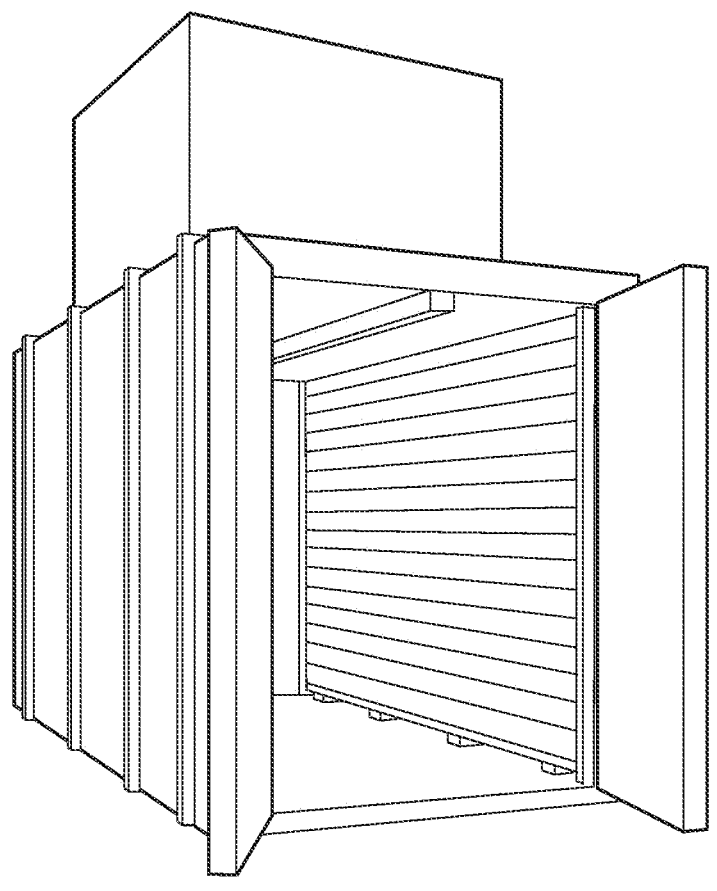
FIG. 3 illustrates an exemplary thermal oven used in Out-of-Autoclave (OOA) processes.
Figure 4:
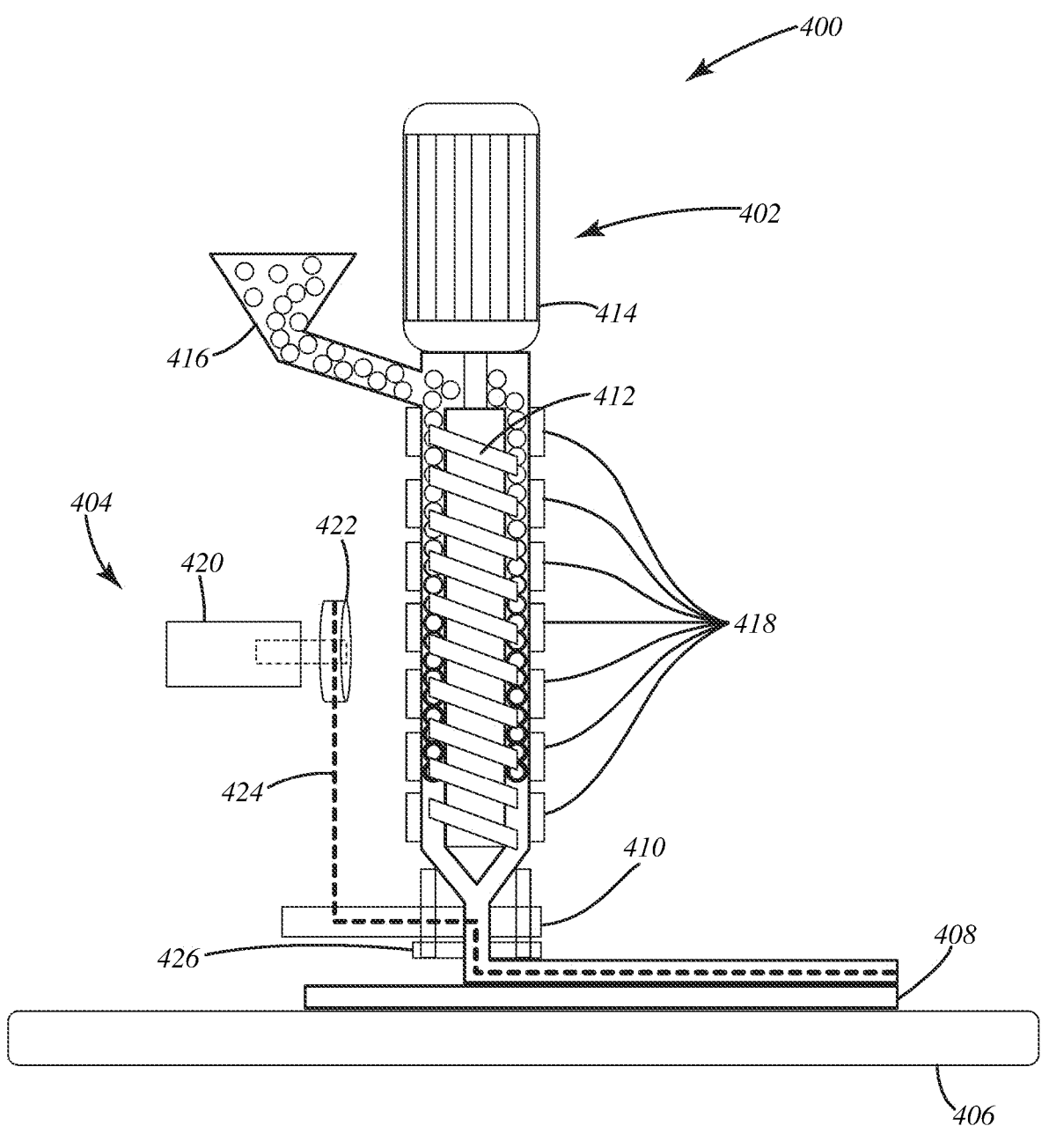
FIG. 4 illustrates an exemplary sectional view of a large format polymer additive manufacturing (LFPAM) system configured for wire coextrusion.
Figure 5:
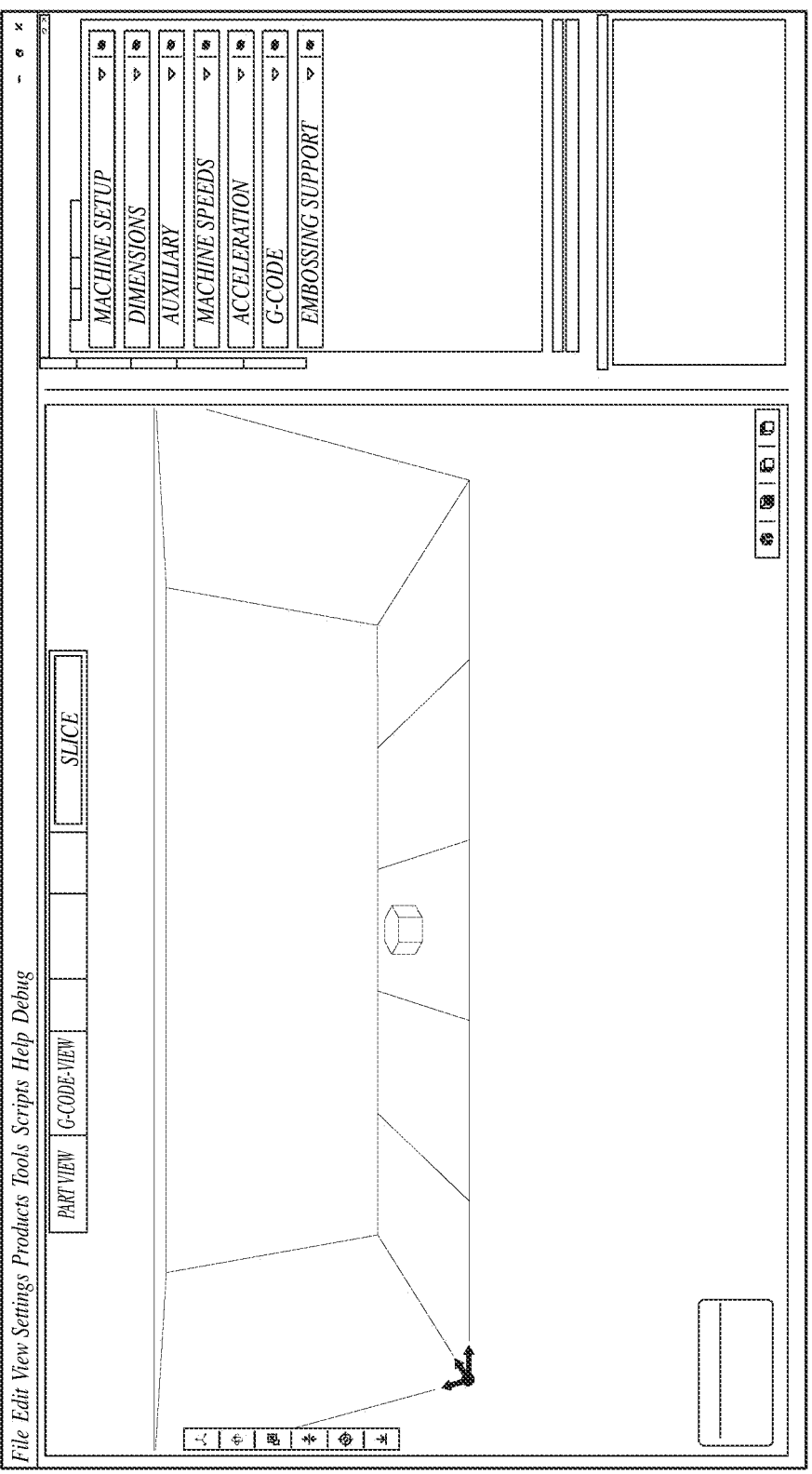
FIG. 5 illustrates an exemplary user interface for slicing software used in additive manufacturing.

FIG. 2 illustrates an exemplary generated toolpaths combined with travel segments and suitable ordering such that the wire bead printing is done in a single pass that pulls the wire tight across the entire surface of the tool. For explanation purposes, the ordering is illustrated by numbers (1-6). That is, the generated toolpath instructions (e.g., G-code) includes pathing to generate the left anchor 132, main object toolpaths (2, 3), outer surface toolpath 4, and right anchor toolpath 5 in order.

One example of a wire embedding algorithm in accordance with the present disclosure can be defined with the following steps:

1. Receive user first input including a building mesh indicative of an object in which to embed wire during printing.
2. Receive second user input including a settings mesh indicative of a region of the object where the wire should be embedded.
3. Receive additional user inputs including print settings.
4. Use the settings mesh to cut the building mesh by performing a Boolean intersection operation, such that the volume contained within the settings mesh becomes a separate region of the print. This step creates a wire region 22.
5. Apply a Boolean difference operation between the building and settings mesh. This defines a remainder volume that creates the surface region 24 and base region 20. In combination with region 22, all three regions can be grouped together to create separate toolpath islands, which can also be referred to as discontinuous paths.
6. Cross-section each of the created islands as well as the original, unedited, model received as part of the first user input.
7. Create anchor geometry, as defined in the settings received as part of the additional user inputs, on each end of the wire region.
8. Generate wire and surface region toolpaths using the created islands.
9. Add wire anchor bead pathing to each end of the wire region.
10. Generate non-wire anchor pathing.
11. Generate pathing for the base region from the geometry received as part of the first user input. The memory encoding instructions can be stored in a non-transitory computer-readable medium and can be executed by a data processing apparatus such as a controller, which includes one or more processors and associated memory. The data processing apparatus can be configured to receive user inputs, process the inputs to generate pathing according to a wire-embedding algorithm, and instruct the LFPAM system accordingly. The memory and data processing apparatus work in conjunction to ensure precise control over the co-extrusion process.
12. Intersect the two outermost beads of the base region with the bead geometry created in step 8, the wire and surface beads.
13. Remove overlapping geometry from the base region such that the wire and surface bead geometry is not altered. Then join together the edited paths in the base region.
14. Add travels and properly order paths. The wire bead paths are configured such that they are all printed in one motion across the entire face of the object, so that the wire is pulled tight and captured by the anchor beads.

The disclosed algorithm operations can include multiple aspects relating to settings mesh geometry, anchor generation, and toolpath combining and intersecting.

Referring back to FIG. 6A, it illustrates an exemplary use of settings regions to affect pathing in specific locations of a build mesh. The user interface 600 illustrates an exemplary build mesh 602 intersecting a settings mesh 604. The pathing plan view 650 illustrates resultant pathing from applying a Boolean intersection and difference operation to the resultant regions such that they are combined to create separate toolpath islands. In this illustrative example, the resultant pathing of the build mesh is adapted to route around the settings mesh with a continuous bead layer that provides efficient pathing for the main build mesh.

Figure 6B:
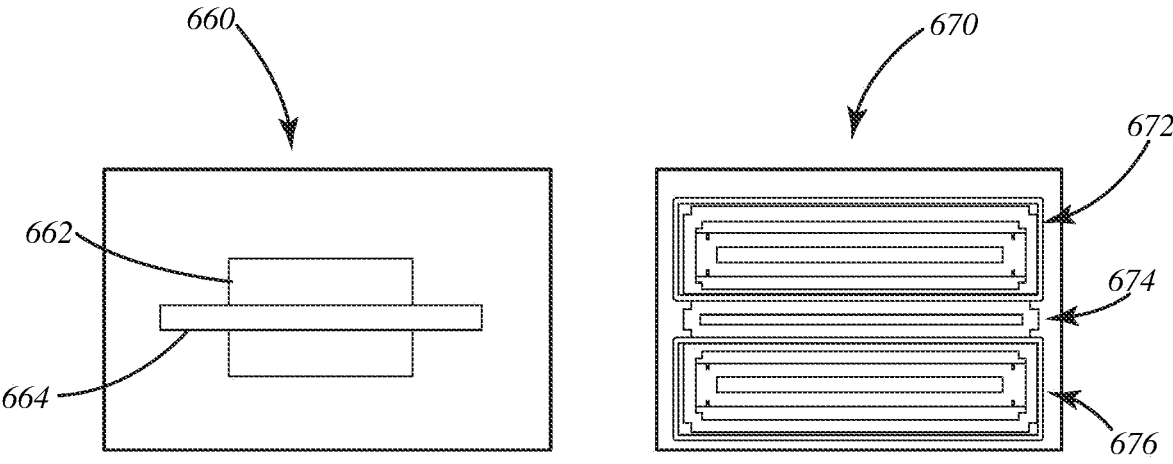
FIG. 6B illustrates two top-down schematic views, one showing intersection of a building mesh and wire feed mesh, and another showing a resultant toolpathing.

FIG. 6B illustrates a user interface 660 depicting a 3D model of a build mesh 662 and a settings mesh 664 before the wire embedding algorithm is applied. User interface 670 depicts additive manufacturing tool pathing based on the wire embedding algorithm. The upper half 672 of the build mesh is separated into its own island toolpath and the lower half of the build mesh is separated into its own island toolpath after the Boolean operation. Further, the area contained within the settings mesh 674 is also separated into its own island toolpath after the Boolean operation. Boolean mesh operations are known, e.g., from the Computational Geometry Algorithms Library (CGAL). However, CGAL is just one well-known computational geometry library that provides details about computational geometry algorithms. These Boolean operations can be applied before the pathing of the object is computed. In FIG. 6B, the controller performs a Boolean operation between the settings mesh 664 and the build mesh 662. Before cross-sectioning was applied, a Boolean intersection operation between the settings mesh 664 and the build mesh 662. The result from this intersection is then joined to the remaining geometry after a Boolean difference operation to produce a resultant mesh. These geometric operations result in three distinct islands for which pathing is computed. Because these regions have been split, the slicing software pathing algorithm evaluates them separately. In essence, by using Boolean operations to generate distinct regions, the pathing algorithm's normal path planning will create independent non-contiguous paths for the different regions (surface, wire feed, and base), which is helpful in facilitating organization and timing for the co-extrusion process. In this way, with the settings mesh, the user can specify where in the object to embed wire along with other desired user settings.

This process can also be affected by appropriate design via computer-aided design (CAD). If a user were to take the build mesh, e.g., the build mesh 662 of FIG. 6B, split it into three separate stereolithography (STL) objects, and load those STLs into a slicing package, the same pathing could be produced. However, disassociating the various regions of interest into multiple independent STLs makes producing subsequent pathing more difficult. Rather, it is more efficient and intuitive to use a settings mesh to define an area of interest for wire coextrusion.

Referring back to FIG. 1A-C, a simple rectangular prism build mesh 10 with a wire-embedded region specified by the settings mesh 12 is provided that represents the object shown in FIG. 7. FIG. 1A shows the user interface essentially just before the automatic slicing has begun. With the settings mesh setup and appropriate user settings selected, slicing can begin. The first step is generally referred to as cross-sectioning. As part of the cross-sectioning step, the build mesh is split according to the settings mesh. For this example, this process results in three areas of geometry: the surface region 24, wire region 22, and base region 20. A visualization of this division during the cross-section step is shown in FIG. 1B.

In one exemplary embodiment, during the cross-sectioning step, two sets of cross-sections are computed. One cross-section is of the original geometry 14, and one is of the geometry after settings mesh Boolean operations have been applied 16. Both sets of cross-sections can be saved in memory and carried through the steps of the slicing process. The original cross-section 14 can be used in combination with the modified cross-section 16 to compute pathing for the base region 20 and surface region 24 of the object, while the modified cross-section 16 can be used to produce pathing for the wire region, after the wire and surface region are removed and will be masked with the modified-cross section to manipulate the pathing.

With cross-sectioning complete, one additional pre-processing step can be provided to facilitate the wire embedding algorithm, anchor generation. For the wire in the wire region to remain taut during construction, the wire is anchored on both sides of the object. These anchors can be automatically generated based on user settings during the slicing process much like other programmatic features such as rafts, brims, or skirts. These anchors can be simple square, cubic, or other shaped objects to which an additional wire region can be affixed to provide the tension during the construction process. Unlike the mold object, the anchors do not have an additional surface region since they generally are not machined. Though, if desired an additional surface region may be provided on each anchor. Once construction is complete, the wires are cut, and the anchors can be discarded.

With all appropriate geometry created, the slicing process can move to the path generation step. The pathing for the wire and surface regions can be computed using the modified-cross section. In general, both regions 22, 24 can be one bead width wide. The pathing for these regions can be generated using skeletons. Skeletons are open loop style paths that are typically used to fill in remaining voids inside of perimeters or other closed contours. In this case, the skeleton pathing produces a straight line for both regions. This is perhaps best shown in FIG. 2 or FIG. 8.

The wire feed region pathing may be augmented to include pathing for the attachment points at the anchor. Like pathing already produced, these anchor points 130 are single bead skeletons appropriately distanced based on user settings. These paths are bundled with the wire region such that they are handled as a combined unit. This has the practical effect of enforcing a purely increasing or decreasing build order once travels have been added at a later step and facilitates the wire coextrusion.

Figure 9:
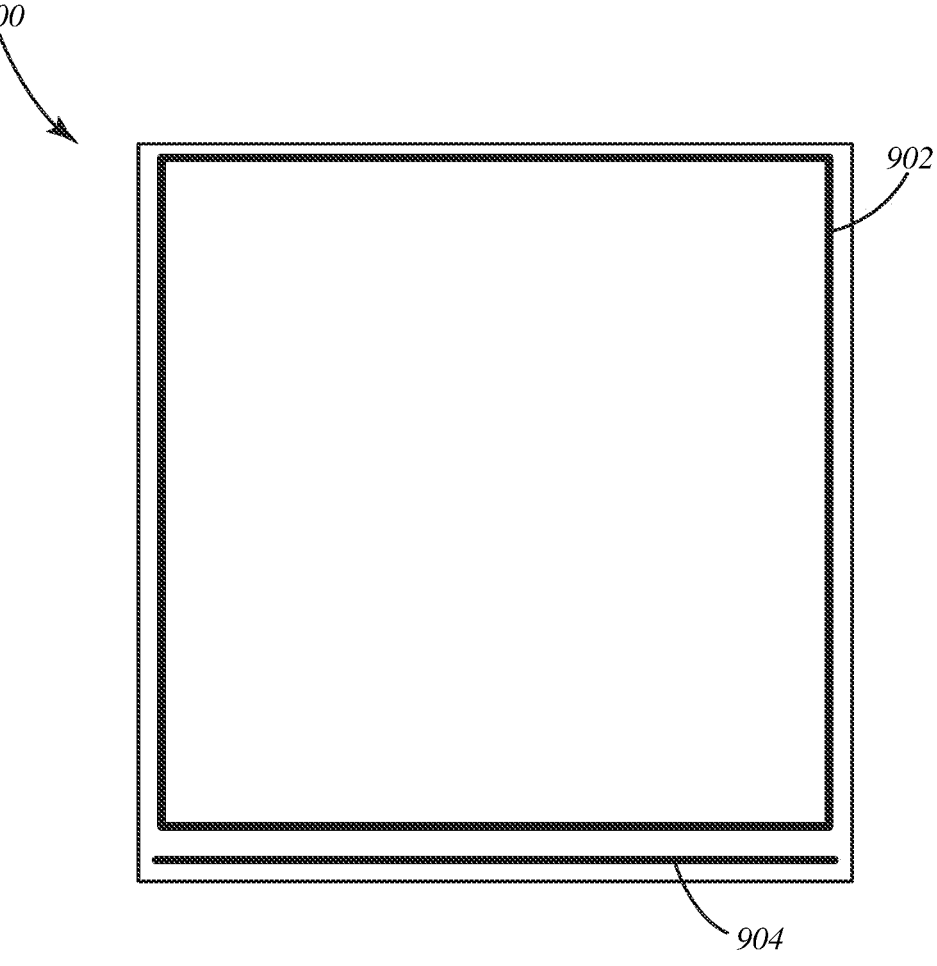
FIG. 9 illustrates a top-down plan view of an anchor toolpath, showing the perimeter path and the embedded wire feed path.

The remaining pathing for the anchors can also be computed. The anchors are programmatically generated based on user settings and are fundamentally like other features such as rafts. Users can specify general settings for size and gap distance, for example, and the structures can be generated. The anchors can include a single perimeter bead with an additional skeleton bead along the front surface where the wire will be placed. An example of this pathing is shown in FIG. 9.

Figure 8:
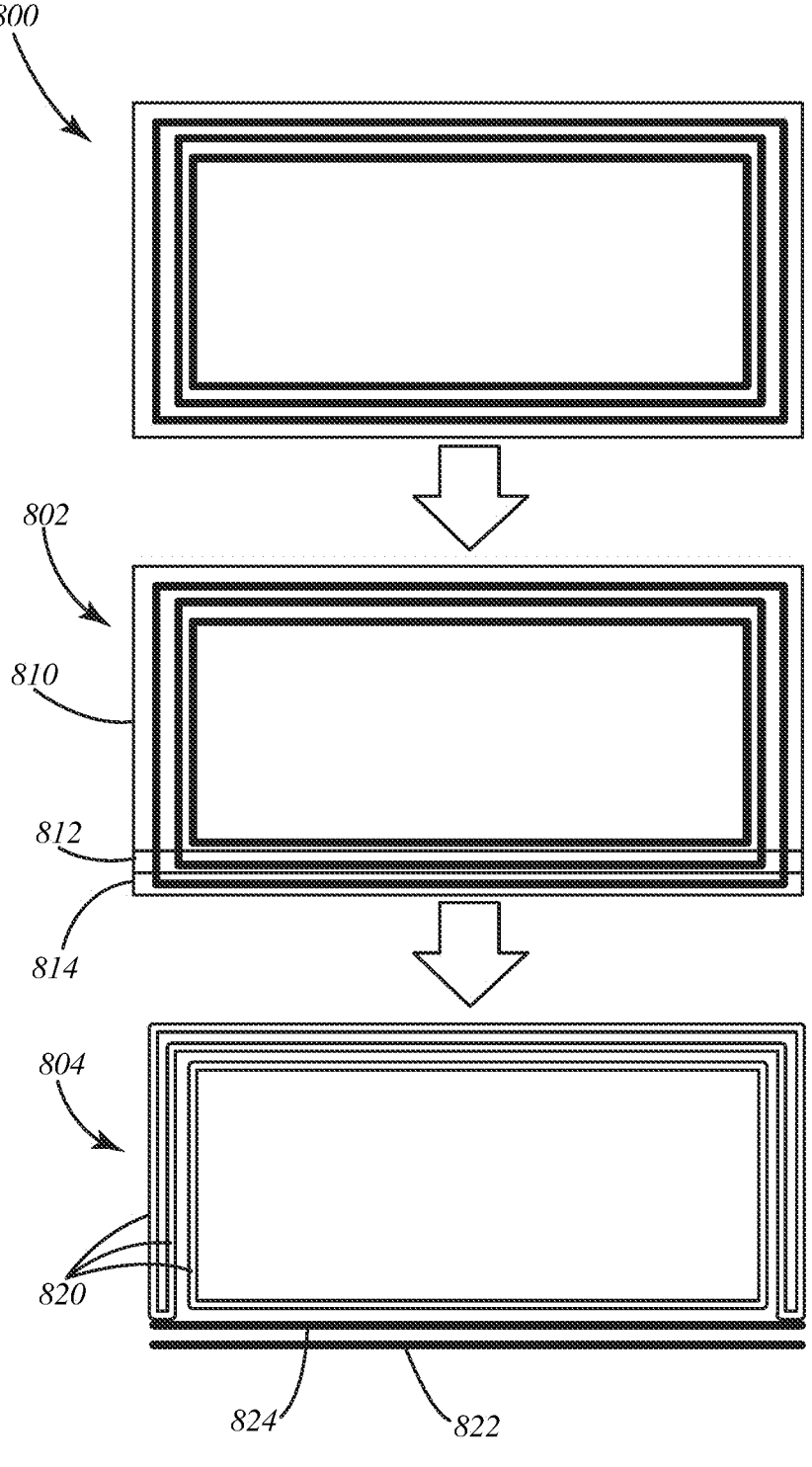
FIG. 8 illustrates a progression of several top-down schematic views illustrating the toolpath generation process for generating toolpaths that facilitate co-extrusion of wire heating element for embedding during additive manufacturing.

The pathing for the base region 20 can be generated in parallel from the unmodified cross-section 14 and the resultant base region pathing 820 is depicted in FIG. 8. In this embodiment, the mold is three beads thick. The three beads are produced because of processing the unmodified cross-section as would happen in any normal slice. Once that pathing generation is complete, the outer two beads can be altered. The outer two beads are intersected with the wire and surface regions from the modified cross-section 16. Polygon line-segment intersection can be decomposed into a line segment-line segment intersection algorithm. The Bentley-Ottmann algorithm is one such algorithm that allows computation of intersection points faster than the naïve approach of evaluating every segment. In brief, this algorithm can be a line sweep algorithm that sweeps a line across all segments that have been sorted by their x location for example. The resulting sweep produces a set of intersections that can be evaluated for path manipulation.

Using these intersections, the beads can be split with any pathing falling inside the wire or surface regions being discarded. The modified cross-section 16 essentially acts as a mask to determine what pathing has not already been computed as part of the other regions. The remaining pathing is no longer a closed contour as a result, so a merge process is applied. Every pair of contours can be spatially sorted to identify the closest points to connect. Once these points are determined, the pathing can be connected to once again form closed contours. Using this approach, an arbitrary number of beads are possible with each odd multiple allowing two preceding outer-most beads to be connected. In this case, the third bead is not altered as it does not intersect either of the other two regions.

With all this pathing laid out, the post-processing step can add travels. Typically, the pathing is connected via travels according to user settings without restriction. To facilitate the wire embedding, some restrictions are added. The pathing that represents the wire region is aligned and connected last. Additionally, the pathing for this region travels from the minimum to maximum or vice versa to guarantee the wire is stretched across the entire object and anchored appropriately. An example slice with numbered pathing is shown in FIG. 2. Here, the travel process begins at the contour bead of the left anchor (1), travels to the beads of the mold base (2-3), moves to the surface region 4, then moves to the right anchor 5, and finally constructs all three segments (130, 122, 130) of the wire feed region 6. The travels insert with respect to all regions except for the wire region can be arbitrarily decided upon, however, the wire region is generally last and conducted consecutively to facilitate the co-extrusion. With this pathing developed, molds with embedded heating elements can be produced automatically using coextrusion.

Referring back to FIG. 7, it illustrates a rendering of a mold with embedded heating element generated by additive manufacturing in accordance with the present disclosure. The generated part includes the self-heating mold 700 and two anchors 702, 704. A close-up of a portion of the surface of the three-bead molding surface 710 is illustrated. The three-beat molding surface includes a surface bead 712, a wire embedded bead 714, and a base bead 716. The co-extruded wires 716 run through the wire embedded bead 714. The anchors 702, 704 keep tension in the wire during the printing process. For explanation purposes, the surface geometry is illustrated in a simple fashion and based off of the 3D model representation depicted in FIG. 1A-C. That is, the augmented slicer software to additively manufacture the self-heating mold 700 and anchors 702, 704 can be automatically generated based on the modified and unmodified cross-sections of FIGS. 1B-C. In the current embodiment the surface of the self-heating mold can be generated by the modified cross-section illustrated in FIG. 1C, while the toolpath for the rest of the mold can be generated by the unmodified cross-section. The anchors can be generated to facilitate wire tension based on the modified cross-section.

FIG. 8 illustrates an exemplary method 800 for toolpath generation in accordance with the present disclosure. First, a basic mold toolpath 800 can be generated based on nothing but the mold model. This toolpath does not account for any wire embedding regions and instead shows an optimized toolpath to additively manufacture the mold without any embedded wires.

An intermediate image 802 shows how the mold base can be modified with particular parameters. That is, a separate, sectioned, model can be generated based on the unmodified mold toolpath. This sectioned representation is illustrated with a mask showing the modified cross-section and includes three parts: an object base area 810, a wire-embedded bead area 812, and a surface bead area 814.

The intermediate image 802 can then be used to generate a modified cross-section. The wire embedding algorithm of the present disclosure can convert these three separate areas 810, 812, 814 into separate toolpaths to enhance and facilitate the co-extrusion process for the wire, allowing it to be co-extruded at the appropriate time in the additive manufacturing process and kept suitably tensioned without interaction from an operator. An exemplary toolpath for additively manufacturing a mold is shown as model representation 804. The pathing includes three modified perimeter beads 820 and two skeleton beads 822, 824. One of the skeleton beads is the wire feed bead 824 and one is the surface bead 822.

FIG. 9 shows an exemplary toolpath plan view of an anchor 900. The anchor 900 is essentially composed of two paths, a perimeter path 902 and a skeleton or embedded wire path 904. In operation, an additive manufacturing device can follow the perimeter path 902 to generate a single perimeter bead and can follow the embedded wire path 904 to generate an embedded wire bead for encapsulating co-extruded wire.

Some embodiments of the present disclosure utilize nichrome alloy wire for the co-extrusion. Nichrome allow wire generally has high electrical resistance and an ability to generate heat efficiently when energized. This makes nichrome wire suitable for embedding within self-heating molds and tools to facilitate consistent and reliable heating performance across the surface of the mold. The integration of nichrome wire within polycarbonate with carbon fibers (PC/CF) or polycarbonate with glass fibers (PC/GF) composites can further enhance structural, thermal, or other properties of the printed object, or a combination thereof. Different embodiments can construct molds using different types of thermoplastic composite pellets. For example, in one embodiment a mold can be constructed from polycarbonate with 20 wt. % carbon fiber loading (PC/CF) and in another embodiment the mold can be constructed from polycarbonate with 20 wt. % glass fiber loading (PC/GF). For the wire-embedded region, a nichrome alloy wire with Nickel 60%, Chromium 16%, and Iron 24%, and a diameter of 0.508 mm can be used. Heat maps of two exemplary molds using these materials are depicted in FIG. 10B. These molds provide reasonable tensile and flexural behavior and generally uniform thermal distribution.

One practical benefit of the embodiments of the present disclosure is the ability to support more complex geometries. While the examples described herein have been relatively simple rectilinear geometries to facilitate explanation, the pathing algorithms are not restricted to rectilinear geometry. The slicing software and associated algorithms described herein are capable of ingesting meshes of any shape and complexity and producing pathing with the necessary commands for wire coextrusion. The settings mesh can be essentially any shape and is representative of the volume in which wire coextrusion is expected to occur in.

Referring to FIG. 2, the method can include travel optimization of the printer head to ensure that wire-embedded beads are grouped during the additive manufacturing process. That is, as the various toolpaths are traversed and the printer head nozzle lays down the various polymer beads, the ordering plays a role in ensuring that the wire co-extrusion is successful. By grouping the wire-embedded beads toward the end of the layer, the wire can be coextruded at the appropriate layer of the print on the left anchor, across the wire-embedding area of the mold, and across the second anchor, which facilitates suitable wire tensioning.

Figure 10A:
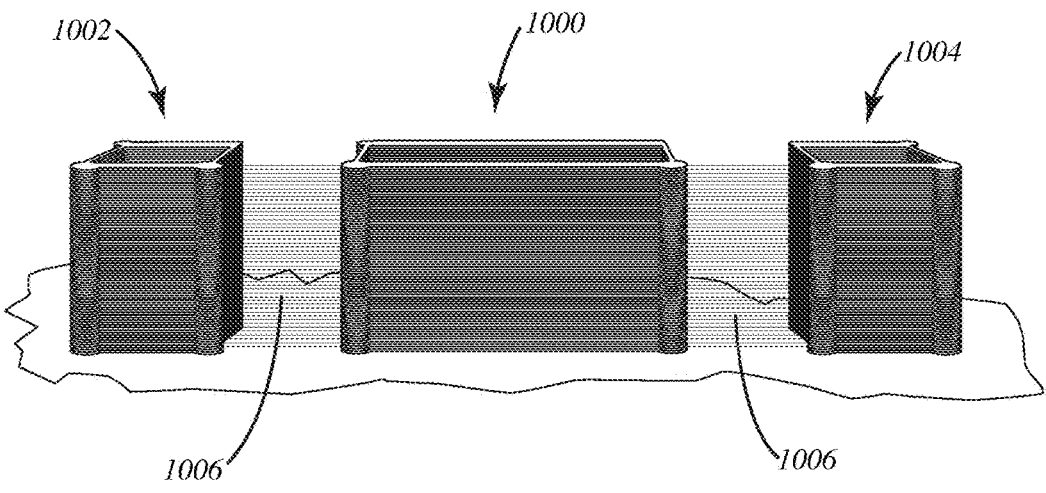
FIG. 10A illustrates a self-heating mold additively manufactured using the wire-embedding additive manufacturing process of the present disclosure.
Figure 10B:
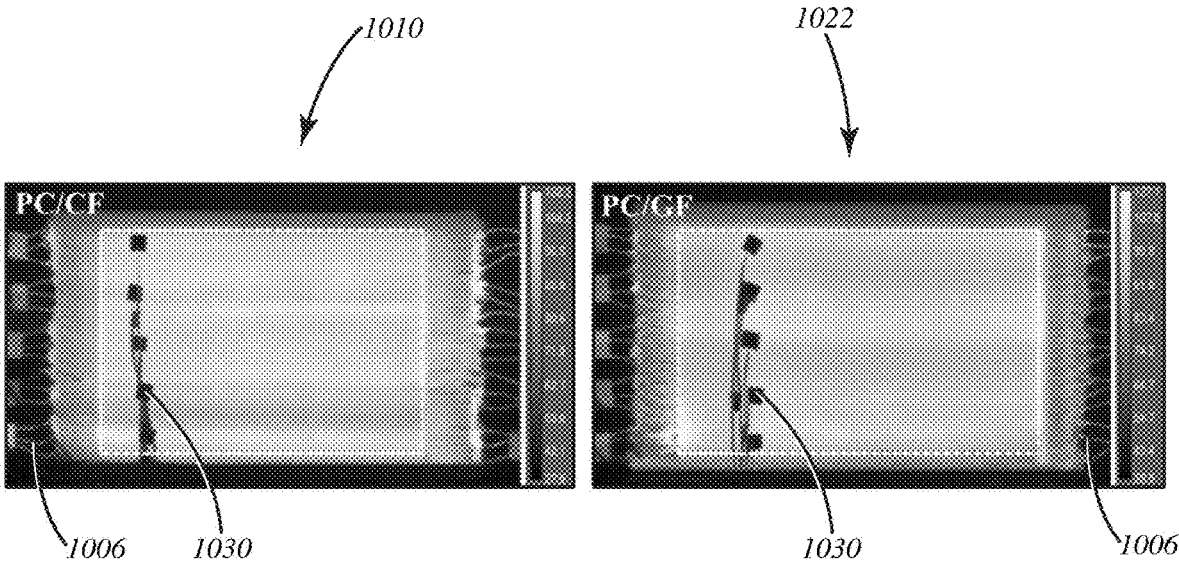
FIG. 10B illustrates two thermal heat map images demonstrating the effective heating area of the mold manufactured with different polymer materials.

FIGS. 10A-B illustrate an exemplary self-heating mold generated with the wire-embedding additive manufacturing process of the present disclosure as well as thermal images illustrating the effective heating area of the mold. The additively manufactured part includes the self-heating mold 1000 as well as two anchors 1002, 1004. The wires 1006 run across the surface of the anchors 1002, 1004 and through an embedded layer in the self-heating mold, which allows the wires to act as embedded heating elements.

In some embodiments, the system includes a cutting system, such as laser cutting system or mechanical blades.

The cutting system can be issued commands for wire cutting at the end of a pull across the entirety of the anchors/mold so that the additive manufacturing can continue on to the next layer. A cutting system can also be configured to separate the anchors from the self-heating mold after the print is complete. The wires can be prepared for connection to an electrical heater system to energize the self-heating mold. This process enhances the functionality and usability of the mold by removing any excess material and finalizing the wire placement. This essentially allows the mold to be used effectively in Out-Of-Autoclave (OOA) processes.

Two exemplary molds were printed using the techniques of the present disclosure, one utilizing polycarbonate with carbon fibers (PC/CF) and one utilizing polycarbonate with glass fibers (PC/GF). In order to demonstrate the effective heating areas of the self-heating molds printed with these different materials, thermocouples 1030 were mounted to the outer surface of the molds to measure temperatures across the surface. The wires were connected to an electrical heater and energized and the temperatures were monitored over a period of two hours. As shown by the heat maps of FIGS. 10B, the heating generated by the embedded heating wires is generally uniform across the mold surface. The temperature scale is illustrated on the right of each graph and the grayscale values generally correspond to the temperature values listed. As depicted the temperatures are fairly consistent across the surface of both molds. For the PC/CF mold, the temperature generally falls within the range of 88 degrees Celsius and 132 degrees Celsius while the PC/GF mold has a slightly lower temperature range between about 84-125 degrees Celsius. These are just exemplary self-heating molds, other exemplary self-heating molds may be manufactured using a different set of additive manufacturing parameters and using different materials that may alter the various characteristics of the self-heating mold, including its temperatures across the surface of the mold.

The disclosed technologies can automatically section the part and emplace wire beads. The disclosed technologies also can generate anchors automatically. All of this can be completed during a conventional slicing workflow rather than requiring additional software or post-processing steps. Further, the disclosed technologies can be used generally in manufacturing a wide variety of objects. For example, the disclosed technologies can be used for manufacturing self-heated tools, self-heated molds, and heated seating, to name a few examples.

The disclosed systems and methods for path planning co-extruded wire in additive manufacturing offers several advantages with minimal additional computational overhead. The disclosed approach facilitates better wire placement and more efficient anchoring, leading to improved structural integrity and functionality of the printed parts. This solution also allows for more complicated wire placement patterns, enabling the creation of advanced geometries and enhancing the overall design flexibility. Furthermore, the automated placement of wires streamlines the manufacturing process, reducing manual intervention and increasing efficiency. These potential benefits collectively contribute to a more robust and versatile additive manufacturing process, significantly advancing the capabilities of co-extrusion in the context of large-scale additive manufacturing.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A non-transitory computer-readable medium storing instructions that, when executed by a data processing apparatus, cause the data processing apparatus to perform operations comprising:

receiving user input including (i) a building mesh indicative of an object in which to embed metallic wire through co-extrusion printing, (ii) a settings mesh indicative of a wire region of the object where the metallic wire is to be embedded, and (iii) an anchor mesh indicative of an anchor, such that two copies of the anchor each to be printed using polymer are to support ends of the metallic wire extending outside of the object during printing;

performing a Boolean intersection of the settings mesh and the building mesh to cut the building mesh into a wire mesh corresponding to the wire region;

performing a subtractive mesh operation to remove geometry corresponding to the wire mesh from the building mesh to create a surface mesh corresponding to a surface region of the object to be printed using polymer, and a base mesh corresponding to a base region of the object separated from the surface region by the wire region, the base region to be printed using polymer;

grouping the base mesh and the surface mesh with the wire mesh and two instances of the anchor mesh in accordance with relative positions during printing of the surface region, the wire region, the base region, and the two copies of the anchor;

performing corresponding pathing algorithms separately for the surface region, the wire region, the base region, and the anchor copies to produce respective sets of printing paths for the surface region, the wire region, the base region, and the anchor copies;

determining an order for traversing the produced printing paths to ensure that the printing paths corresponding for embedding the metallic wire are traversed last; and instructing a large-format polymer additive manufacturing (LFPAM) tool to print, at least based on the produced printing paths and the determined order, the object with the metallic wire partially embedded therein and the anchor copies that support the ends of the metallic wire.

2. The non-transitory computer-readable medium of claim 1, further including causing the data processing apparatus to generate a three-dimensional user interface for defining the building mesh, the settings mesh, and the anchor mesh.

3. The non-transitory computer-readable medium of claim 1, wherein the Boolean intersection and subtractive mesh operations are performed using a slicing algorithm integrated within a slicer software package.

4. The non-transitory computer-readable medium of claim 1, wherein the pathing algorithms for the surface region, the wire region, the base region, and the anchor copies are optimized to minimize material waste and printing time.

5. The non-transitory computer-readable medium of claim 1, wherein the anchor copies are configured to retain tension on the metallic wire during the printing process to ensure proper embedding and alignment.

6. The non-transitory computer-readable medium of claim 1, wherein the object is a composite mold or die.

7. The non-transitory computer-readable medium of claim 1, wherein the polymer comprises a composite of polycarbonate with carbon fibers (PC/CF) or polycarbonate with glass fibers (PC/GF), and the metallic wire comprises a nichrome alloy wire.

8. A system for co-extrusion printing an object with embedded metallic wire, the system comprising:

a data processing apparatus configured to execute memory encoding instructions to:

receive user input including (i) a building mesh indicative of an object in which to embed metallic wire through co-extrusion printing, (ii) a settings mesh indicative of a wire region of the object where the metallic wire is to be embedded, and (iii) an anchor mesh indicative of an anchor, such that two copies of the anchor each to be printed using polymer are to support ends of the metallic wire extending outside of the object during printing;

perform a Boolean intersection of the settings mesh and the building mesh to cut the building mesh into a wire mesh corresponding to the wire region;

perform a subtractive mesh operation to remove geometry corresponding to the wire mesh from the building mesh to cut the building mesh into the surface mesh corresponding to a surface region of the object to be printed using polymer and a base mesh corresponding to a base region of the object separated from the surface region by the wire region, the base region to be printed using polymer;

perform a join operation of the surface and base mesh to the wire mesh and two instances of the anchor mesh in accordance with relative positions during printing of the surface region, the wire region, the base region, and the two copies of the anchor;

generate corresponding pathing algorithms separately for the surface region, the wire region, the base region, and the anchor copies to produce respective sets of printing paths for the surface region, the wire region, the base region, and the anchor copies;

determine an order for traversing the produced printing paths to ensure that the printing paths corresponding for embedding the metallic wire are traversed last; and a large-format polymer additive manufacturing (LFPAM) tool configured to:

print, at least based on the produced printing paths and the determined order, the object with the metallic wire partially embedded therein and the anchor copies that support the ends of the metallic wire.

9. The system of claim 8, wherein the data processing apparatus further generates a three-dimensional user interface for defining the building mesh, the settings mesh, and the anchor mesh.

10. The system of claim 8, wherein the Boolean intersection and subtractive mesh operations are performed using a slicing algorithm integrated within a slicer software package.

11. The system of claim 8, wherein the pathing algorithms for the surface region, the wire region, the base region, and the anchor copies are optimized to minimize material waste and printing time.

* * * * *